(12) United States Patent
Hoover et al.

(10) Patent No.: US 6,316,728 B1
(45) Date of Patent: Nov. 13, 2001

(54) CROSS-CONNECT CABINET

(75) Inventors: Michael Anthony Hoover, Sinking Spring; Marko Konstantin Lubic, Shillington, both of PA (US)

(73) Assignee: Tyco Electronics Logistics AG, Steinach/SG (CH)

( * ) Notice: Subject to any disclaimer, the term of this patent is extended or adjusted under 35 U.S.C. 154(b) by 0 days.

(21) Appl. No.: 09/478,583

(22) Filed: Jan. 6, 2000

(51) Int. Cl.[7] .................................................. H02G 3/18
(52) U.S. Cl. ............................. 174/65 R; 174/655.5; 174/65 G; 174/135; 439/571; 16/2.1
(58) Field of Search ................. 174/65 R, 655.5, 174/64, 152 G, 153 G, 65 G, 135; 298/56; 439/571, 713; 361/827, 724; 385/134, 135; 16/2.1, 2.2

(56) References Cited

U.S. PATENT DOCUMENTS

| | | | |
|---|---|---|---|
| 4,160,880 | 7/1979 | Brey | 179/98 |
| 4,731,501 * | 3/1988 | Clark et al. | 174/65 R |
| 4,835,659 * | 5/1989 | Goodson | 361/390 |
| 5,001,602 * | 3/1991 | Suffi et al. | 361/390 |
| 5,093,885 * | 3/1992 | Anton | 385/134 |
| 5,189,723 | 2/1993 | Johnson et al. | 383/134 |
| 5,708,742 * | 1/1998 | Beun et al. | 385/53 |
| 5,715,145 * | 2/1998 | Wong et al. | 361/796 |
| 5,758,002 * | 5/1998 | Walters | 385/134 |
| 6,044,151 * | 3/2000 | Wallace | 379/399 |

* cited by examiner

Primary Examiner—Dean A. Reichard
Assistant Examiner—Dhiru R Patel
(74) Attorney, Agent, or Firm—Woodcock Washburn Kurtz Mackiewicz & Norris LLP

(57) ABSTRACT

A cross-connect cabinet for an underground telecommunication installation wherein the bundle of conductors electrically connecting the splice connector with a pivoted terminal field is so constructed and arranged to avoid bending the bundle of conductors across the longitudinal axis of the conductors in a manner likely to cause fatigue or other premature conductor failure during the opening and closing of the terminal field of the cross-connect cabinet.

6 Claims, 2 Drawing Sheets

CROSS-CONNECT CABINET

BACKGROUND OF THE INVENTION

1. Field of the Invention

This invention relates to a cross-connect cabinet for a telecommunication installation and particularly to a below ground cross-connect cabinet.

2. Description of the Prior Art

When cross-connect cabinets are installed below ground, they are placed in a below ground enclosure rather than on an above ground level pad. In such telecommunications installations the telephone cable is attached to a terminal field. Terminal fields are well known in the art, an example being disclosed in U.S. Pat. No. 4,160,880 and incorporated herein by this reference thereto. One example of a below ground cross-connect cabinet is disclosed in U.S. Pat. No. 5,189,723. In that patent the cross-connect cabinet is raised vertically out of its below ground enclosure by a vertical reciprocating actuator.

It would be desirable to provide an arrangement whereby the terminal field of a cross-connect cabinet can be accessed without removing the cross-connect cabinet from its below ground enclosure.

SUMMARY OF THE INVENTION

It is an object of the present invention to provide a cross-connect cabinet for a below ground telecommunications installation having a terminal field which folds down to a horizontal position within the underground enclosure when the enclosure is closed and pivots 90° to a vertical working position when the cover of the enclosure is opened. It is a further object of the invention to provide a cabling system for the pivoted terminal field where one end of the cable is attached to the pivoted terminal field and where repeated cycling of the terminal field to open and closed positions does not affect the service life of the cable due to fatigue as other premature wire failure.

In accordance with the present invention there is provided a cross-connect cabinet for a telecommunications installation including an enclosure having an opening for receiving incoming telecommunication cables. A terminal field is pivotally mounted within the enclosure for rotation about a pivotal axis through an angle of about 90° between open and closed positions. A bundle of conductors carries inbound signals from the incoming telecommunications cable to the terminal field. The bundle of conductors has a central axis substantially coincident with the pivotal axis of the terminal field. One end of the bundle of conductors is affixed to the enclosure to stabilize the one end and the opposite end of the bundle of conductors is affixed to the terminal field for rotation of the opposite end therewith whereby when the terminal field is rotated about its pivotal axis to open or close the cross-connect cabinet, the one end of the bundle of conductors is stabilized while the opposite end of the bundle of conductors rotates about the central axis thereby creating a progressive twist over the length of the bundle of conductors between the ends thereof and thus avoiding bending the bundle of conductors across the longitudinal axis of the conductors in a manner likely to cause fatigue or other premature failure during the opening and closing of the terminal field of the cross-connect cabinet. In one form of the invention, a trough extends along the pivotal axis of the terminal field for receiving the bundle of conductors and the trough is mounted on the enclosure and the one end of the bundle is affixed to the trough. Further in accordance with the invention the enclosure has an open top and a cover for closing the open top.

DESCRIPTION OF THE PREFERRED EMBODIMENT

Referring to FIGS. 1–4 there is illustrated a cross-connect cabinet for a telecommunication installation and particularly suited for a below ground installation. In such installations it is necessary to provide convenient access to it for the workman while creating a workable balance between minimizing space requirements for the enclosure but providing adequate work space inside it. Because cross-connect cabinets are frequently installed under sidewalks, such installations are tightly space constrained. In such installations the cabinets are restricted to about 4 feet in width because of the need to minimize traffic disruption on the sidewalk while the cabinet is open. Such installations are also restricted in depth because of other utilities running under the sidewalks The cross-connect cabinet described herein allows all of these requirements to be met.

Figure 1:
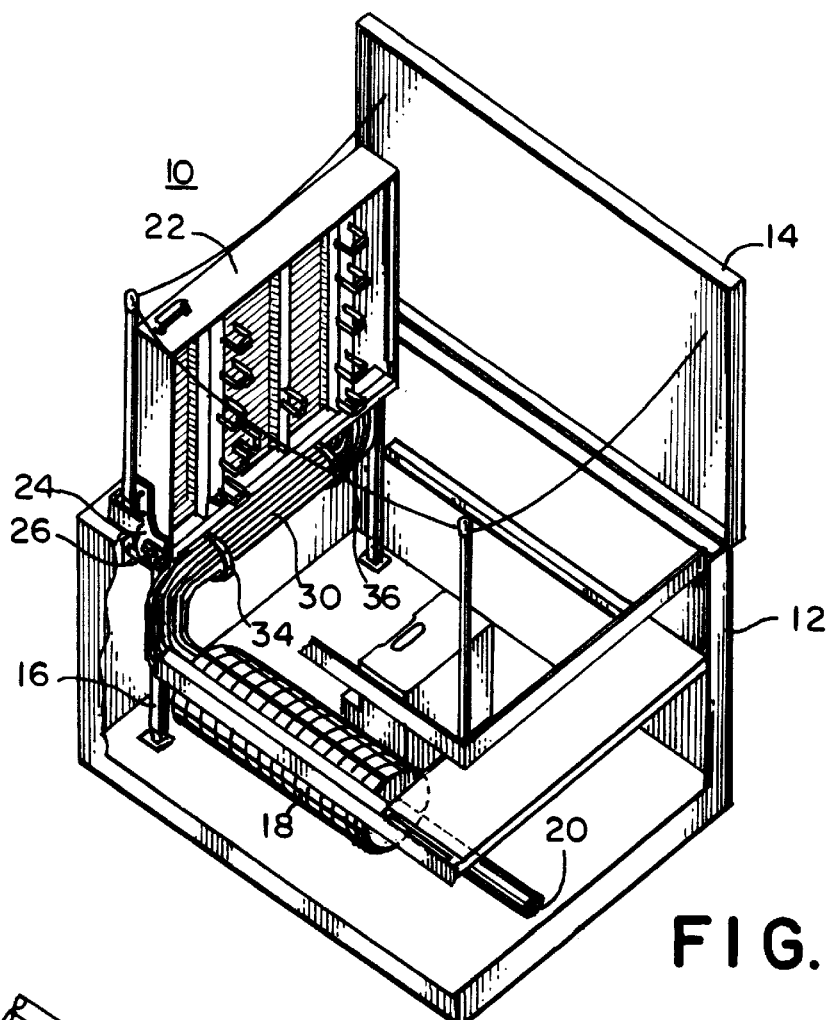
FIG. 1 is a perspective view of a cross-connect cabinet for a telecommunications installation embodying the present invention showing the terminal field in open position.
Figure 3:
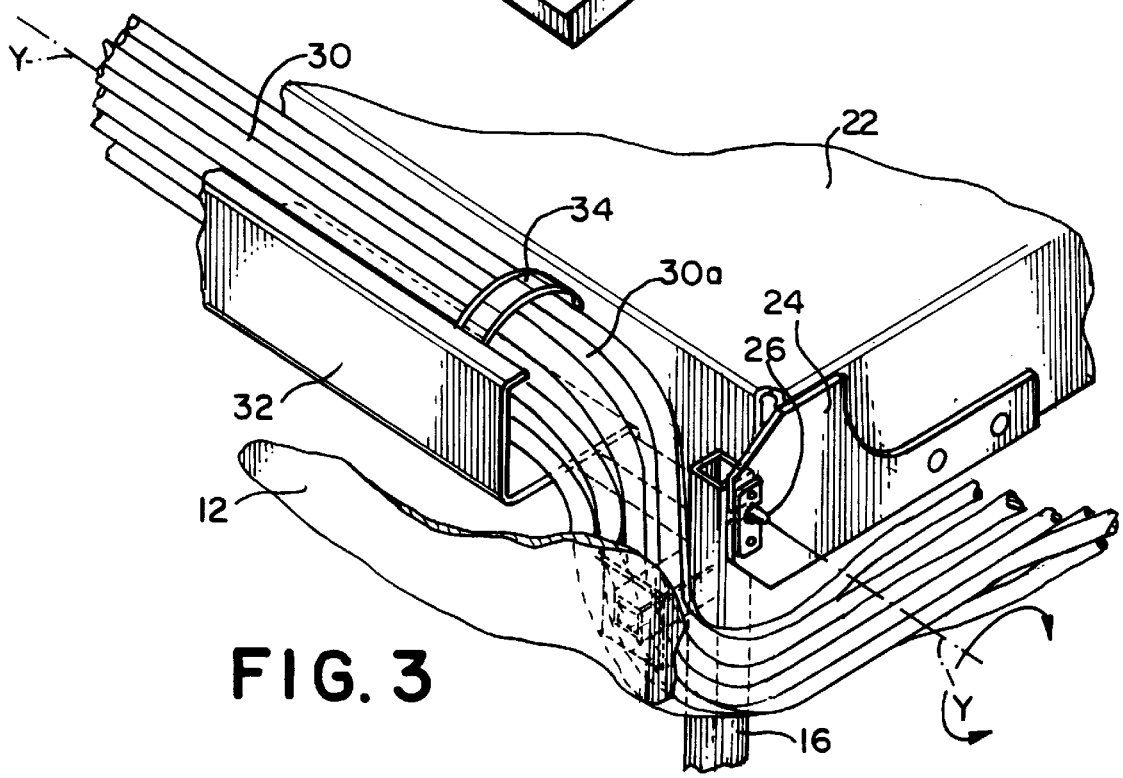
FIG. 3 is a perspective view on enlarged scale showing one corner of the terminal field of FIG. 2.

Referring to FIG. 1 there is illustrated a cross-connect cabinet 10 for a below ground telecommunication installation. It includes a vault or enclosure 12 having a cover 14 that pivots to a vertical position as shown in FIG. 1 when the enclosure is open. As pointed out above the enclosure 12 is adapted to be installed beneath a sidewalk. In one embodiment the enclosure 12 had a length of approximately 60", a width of approximately 48" and a depth of approximately 44". Mounted within the enclosure 12 is a metal frame 16 which supports the various pieces of equipment within the enclosure 12.

Figure 2:
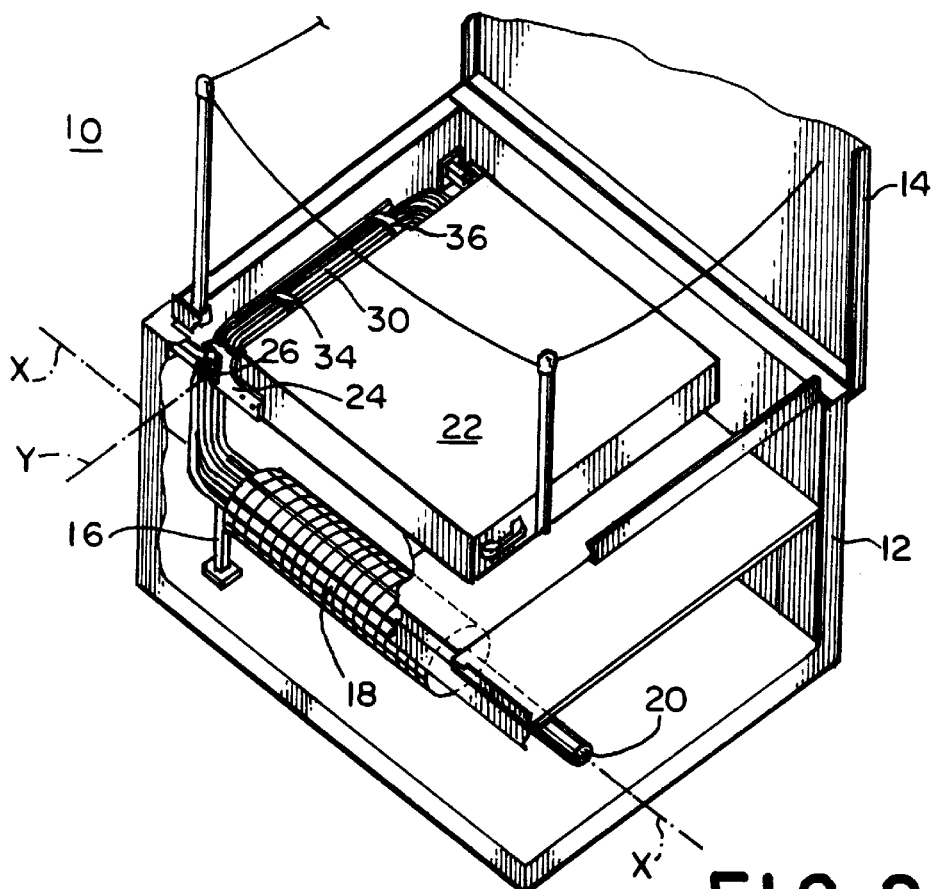
FIG. 2 is a perspective view similar to FIG. 1 but showing the terminal field in the closed or horizontal position.
Figure 4:
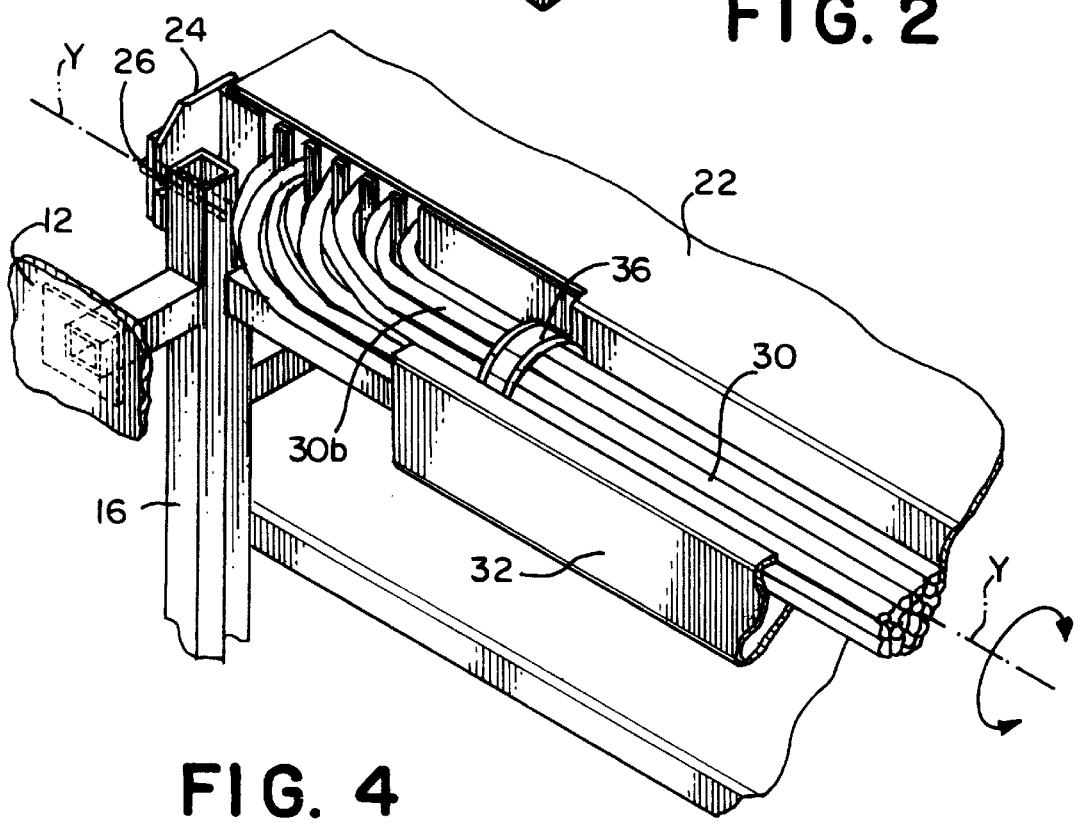
FIG. 4 is a perspective view on enlarged scale showing the opposite corner of the terminal field of FIG. 2.

In FIGS. 1 and 2 there is shown a splice connector 18 mounted within the enclosure 12 for electrical connection to incoming telecommunication cables 20 from the telephone company. The incoming telecommunication cables 20 are inserted through an opening in the end of the enclosure 12 and have an axis substantially coincident with the longitudinal axis x of the splice connector 18. A terminal field 22 is pivotally mounted within the enclosure 12 for rotation through an angle of about 90° between open and closed positions. The open position is illustrated in FIG. 1 where the terminal field 22 is in a substantially vertical position and the closed position is illustrated in FIG. 2 where the terminal field 22 is in a substantially horizontal position. As may be seen in FIGS. 3 and 4 the opposite ends of the terminal field 22 are provided with a pair of brackets 24 which are pivoted at 26 to the vertical frame members 16. The pivotal axis y of the terminal field 22 extends between the pivot members 26 and is substantially perpendicular to the longitudinal axis x of the splice connector 18. A bundle of conductors 30 is electrically connected at one end thereof to the splice connector 18 and at the opposite end thereof to the terminal field 22. It is important that the conductors 30 not be oriented so as to flex 90° along with the opening and closing of the terminal field 22. If such orientation were used with solid copper wire, such solid copper wire hardens quickly so that after a few cycles of opening and closing the terminal field, the wires are susceptible to breakage. This result cannot be tolerated by a telephone company. An alternate solution is to change from solid copper wire to braided cable which stands up to the flexing, but this is not acceptable to the telephone company due to incompatibility with splicing equipment, etc.

This problem is eliminated with the cabling system of the present invention. It will be seen that the bundle of conductors 30 has a central axis substantially coincident with the pivotal axis y of the terminal field 22. The bundle 30 extends through a trough 32 which is mounted on the frame 16 within the enclosure 12. One end 30*a*, FIG. 3, of the bundle of conductors is affixed by a strap 34 to the trough and enclosure to stabilize the end 30*a*. The opposite end 30*b*, FIG. 4, of the bundle 30 of conductors is affixed by strap 36 to the terminal field 22 for rotation of the end 30*b* therewith whereby when the terminal field 22 is rotated about its pivotal axis y to open or close the cross-connect cabinet the end 30*a* of the bundle of conductors is stabilized while the opposite end 30*b* of the bundle of conductors rotates about its central axis thereby creating a progressive twist over the length of the bundle of conductors between the ends 30*a* and 30*b* thereof. In one embodiment of the invention the distance between the end 30*a* and 30*b* was about two feet. This avoids bending the bundle of conductors 30 across the longitudinal axis of the conductors in a manner likely to cause fatigue or other premature conductor failure during the opening and closing of the terminal field 22 of the cross-connect cabinet.

Whenever it is necessary for a workman to obtain access to the terminal field, the cover 14 of the enclosure 12 is opened to the position shown in FIGS. 1 and 2. The terminal field 22 is moved from its horizontal position of FIG. 2 to the vertical position of FIG. 1 where the service man can have access to it. After the work has been completed, the terminal field is rotated to the closed or horizontal position of FIG. 2 and the cover 14 is closed. From the foregoing it will be seen that the present invention by pivoting the terminal field 90° provides convenient access to it for the workman while maintaining a workable balance between minimizing space requirements for the enclosure but providing adequate work space inside it. The present invention by utilizing the controlled cable path between the splicer and the terminal field provides the result such that when the terminal field is rotated through 90°, instead of a 90° flex, the cable receives a very slight twist over about a 2' length, with substantially no resultant damage to the cable's working life.

While there has been described a preferred embodiment of the invention, it will be understood that further modifications may be made without departing from the spirit and scope of the invention as set forth in the appended claims. For example this embodiment has been described and illustrated in connection with a splice connector. It is to be understood that this novel cabeling system may be utilized in systems without a splice connector.

What is claimed is:

1. A cross-connect cabinet for a telecommunication installation comprising an enclosure having an opening for receiving incoming telecommunication cables, a terminal field pivotally mounted within said enclosure for rotation about a pivotal axis through an angle of about 90° between open and closed positions, a bundle of conductors carrying inbound signals from incoming telecommunication cables to said terminal field, said bundle of conductors having a central axis substantially coincident with the pivotal axis of said terminal field, means for affixing one end of said bundle of conductors to said enclosure to stabilize said one end, and means for affixing the opposite end of said bundle of conductors to said terminal field for rotation of said opposite end therewith whereby when said terminal field is rotated about its pivotal axis to open or close the cross-connect cabinet, said one end of said bundle of conductors is stabilized while said opposite end of said bundle of conductors rotates about said central axis thereby creating a progressive twist over the length of said bundle of conductors between said ends thereof and thus avoiding bending said bundle of conductors across the longitudinal axis of the conductors in a manner likely to cause fatigue or other premature conductor failure during the opening and closing of the terminal field of the cross-connect cabinet.

2. A cross connect cabinet for a telecommunication installation according to claim 1 including a trough extending along the pivotal axis of said terminal field for receiving said bundle of conductors, said trough being mounted on said enclosure and said one end of said bundle being affixed to said trough.

3. A cross-connect cabinet for a telecommunication installation according to claim 1 wherein said enclosure has an open top and a cover for closing said open top, whereby when said cover is moved to open position, said terminal field is rotatable to open position for access thereto through the open top of said enclosure.

4. A cross-connect cabinet for a telecommunication installation comprising an enclosure having an opening for receiving incoming telecommunication cables, a splice connector mounted within said enclosure for electrical connection to incoming telecommunication cables, a terminal field pivotally mounted within said enclosure for rotation about a pivotal axis through an angle of about 90° between open and closed positions, a bundle of conductors electrically connected at one end thereof to said splice connector and at the opposite end thereof to said terminal field, said bundle of conductors having a central axis substantially coincident with the pivotal axis of said terminal field, means for controlling the movement of said one end of said bundle of conductors to stabilize said one end, and means for controlling the movement of said opposite end of said bundle of conductors for rotation of said opposite end with said terminal field whereby when said terminal field is rotated about its pivotal axis to open or close the cross-connect cabinet, said one end of said bundle of conductors is stabilized while said opposite end of said bundle of conductors rotates about said central axis thereby creating a progressive twist over the length of said bundle of conductors between said ends thereof and thus avoiding bending said bundle of conductors across the longitudinal axis of the conductors in a manner likely to cause fatigue or other premature conductor failure during the opening and closing of the terminal field of the cross-connect cabinet.

5. A cross-connect cabinet for a telecommunication installation according to claim 4 including although extending along the pivotal axis of said terminal field for receiving said bundle of conductors, said trough being mounted on said enclosure and said one end of said bundle being affixed to said trough.

6. A cross-connect cabinet for a telecommunication installation according to claim 4 wherein said enclosure has an open top, a cover for closing said open top, said splice connector having a longitudinal axis, said terminal field being mounted above said splice connector and having the pivotal axis thereof substantially perpendicular to the longitudinal axis of said splice connector, whereby when said cover is moved to open position, said terminal field is rotatable to open position for access thereto through the open top of said enclosure.

* * * * *